US012742737B2

(12) United States Patent
Seo et al.

(10) Patent No.: US 12,742,737 B2
(45) Date of Patent: Sep. 22, 2026

(54) IMAGING SYSTEM AND IMAGING INSPECTION APPARATUS INCLUDING THE SAME

(71) Applicant: Samsung Electronics Co., Ltd., Suwon-si (KR)

(72) Inventors: Min Hwan Seo, Suwon-si (KR); Junsuk Rho, Pohang-si (KR); Sang Woo Bae, Suwon-si (KR); Trevon James Badloe, Pohang-si (KR); Yeseul Kim, Pohang-si (KR); Inki Kim, Pohang-si (KR); Joohoon Kim, Pohang-si (KR)

(73) Assignees: Samsung Electronics Co., Ltd., Gyeonggi-do (KR); Postech Research And Business Development Foundation, Gyeongsangbuk-do (KR)

( * ) Notice: Subject to any disclaimer, the term of this patent is extended or adjusted under 35 U.S.C. 154(b) by 120 days.

(21) Appl. No.: 18/623,629

(22) Filed: Apr. 1, 2024

(65) Prior Publication Data

US 2025/0076204 A1 Mar. 6, 2025

(30) Foreign Application Priority Data

Aug. 31, 2023 (KR) ........................ 10-2023-0115550

(51) Int. Cl.
*G01N 21/88* (2006.01)
*G01N 21/21* (2006.01)

(52) U.S. Cl.
CPC ......... *G01N 21/8806* (2013.01); *G01N 21/21* (2013.01); *G01N 21/8851* (2013.01);
(Continued)

(58) Field of Classification Search
CPC ........... G01N 2021/8848; G01N 21/21; G01N 21/8806; G01N 21/8851; G01N 21/956;
(Continued)

(56) References Cited

U.S. PATENT DOCUMENTS

| | | | | |
|---|---|---|---|---|
| 11,333,614 | B2 | 5/2022 | Chen et al. | |
| 11,598,964 | B2 * | 3/2023 | Jamali | G02B 13/14 |

(Continued)

FOREIGN PATENT DOCUMENTS

| | | | | |
|---|---|---|---|---|
| KR | 2002-0014984 | A | 2/2002 | |
| KR | 20210061292 | A * | 5/2021 | G03H 1/0443 |

(Continued)

OTHER PUBLICATIONS

Wei Ting Chen et al., "Flat optics with dispersion-engineered metasurfaces", Reviews, vol. 5, Aug. 2020, pp. 604-620.

(Continued)

*Primary Examiner* — Tri T Ton
(74) *Attorney, Agent, or Firm* — Harness, Dickey & Pierce, P.L.C.

(57) ABSTRACT

An imaging system that includes a first polarization structure that polarizes light provided from a light source into first polarized light, a first power supply connected to the first polarization structure and that applies a first voltage to the first polarization structure, a meta-lens on which the first polarized light is incident, a second polarization structure that converts the first polarized light that passes through the meta-lens into second polarized light, a second power supply connected to the second polarization structure and that applies a second voltage to the second polarization structure, and an image sensor that senses the second polarized light. The first voltage and the second voltage are different from each other.

20 Claims, 13 Drawing Sheets

(52) U.S. Cl.
CPC ................ *G01N 2021/8848* (2013.01); *G01N 2201/069* (2013.01)

(58) Field of Classification Search
CPC .. G01N 2201/069; F21S 41/275; F21V 5/045; F21W 2102/13; G01B 11/02; G01B 11/24; G02B 3/0043; G02B 3/04
See application file for complete search history.

(56) References Cited

U.S. PATENT DOCUMENTS

| | | | | |
|---|---|---|---|---|
| 2006/0221284 | A1* | 10/2006 | Yata | H04N 13/31 349/119 |
| 2017/0199116 | A1* | 7/2017 | Yasuno | G01N 21/21 |
| 2018/0024063 | A1* | 1/2018 | Egner | G02B 27/58 359/386 |
| 2021/0318467 | A1 | 10/2021 | Zhou et al. | |
| 2022/0055479 | A1* | 2/2022 | Qin | G02B 27/283 |

FOREIGN PATENT DOCUMENTS

| | | | |
|---|---|---|---|
| KR | 2021-0150250 | A | 12/2021 |
| KR | 2022-0086457 | A | 6/2022 |
| KR | 2022-0141563 | A | 10/2022 |

OTHER PUBLICATIONS

Saman Jahani et al., “All-dielectric metamaterials”, Nature Nanotechnology, vol. 11, Jan. 7, 2016, pp. 23-36.
Youngjin Kim et al., “Spiral Metalens for Phase Contrast Imaging”, Advanced Functional Materials, vol. 32, No. 2106050, 2022, 9 pgs.
Nanfang Yu et al., “Flat optics with designer metasurfaces”, Nature Materials, vol. 13, Jan. 23, 2014, pp. 139-150.
Nara Jeon et al., “Electrically tunable metasurfaces: from direct to indirect mechanisms”, New Journal of Physics, vol. 24, No. 075001, Jul. 21, 2022, 18 pages.

* cited by examiner

IMAGING SYSTEM AND IMAGING INSPECTION APPARATUS INCLUDING THE SAME

CROSS-REFERENCE TO RELATED APPLICATION

This application claims priority from Korean Patent Application No. 10-2023-0115550 filed on Aug. 31, 2023 in the Korean Intellectual Property Office, and all the benefits accruing therefrom under 35 U.S.C. 119, the contents of which in its entirety are herein incorporated by reference.

BACKGROUND

The present disclosure relates to imaging systems and imaging inspection apparatuses including the same.

Recently, the importance of shape measurement and internal thin film thickness measurement is increasing to ensure product quality and stability in semiconductor, display, and/or secondary battery fields. In this regard, an imaging system that inspects a center area of a measurement target using lighting, an objective lens, and a tube lens, or an imaging system that inspects an edge area of the measurement target is widely used.

It is difficult to inspect the center area and the edge area of the measurement target. Thus, research is underway on a single system that inspects the center area and the edge area of the measurement target.

SUMMARY

Example embodiments of the inventive concepts provide an imaging system with improved efficiency and performance.

Example embodiments further provide an imaging inspection apparatus with improved efficiency and performance.

Embodiments of the inventive concepts are not limited to the above-mentioned, and other embodiments and advantages according to the inventive concepts that are not mentioned may be understood based on following description, and may be more clearly understood based on example embodiments according to the inventive concepts. Further, it will be easily understood that the embodiments and advantages according to the inventive concepts may be realized using features shown in the claims or combinations thereof.

Embodiments of the inventive concepts provide an imaging system that includes a first polarization structure that polarizes light provided from a light source into first polarized light responsive to a first voltage; a first power supply connected to the first polarization structure, and the first power supply applies the first voltage to the first polarization structure; a meta-lens on which the first polarized light is incident; a second polarization structure that converts the first polarized light that passes through the meta-lens into second polarized light responsive to a second voltage; a second power supply connected to the second polarization structure, and the second power supply applies the second voltage to the second polarization structure; and an image sensor that senses the second polarized light. The first voltage and the second voltage are different from each other.

Embodiments of the inventive concepts further provide an imaging inspection apparatus that includes a measurement target; a light source that irradiates measurement light toward the measurement target; a first polarization structure that polarizes the measurement light into first polarized light; a first power supply connected to the first polarization structure, and the first supply applies a voltage to the first polarization structure; a meta-lens on which the first polarized light is incident; a second polarization structure that converts the first polarized light that passes through the meta-lens into second polarized light; a second power supply connected to the second polarization structure, and the second power supply applies a voltage to the second polarization structure; and an image sensor that senses the second polarized light. The measurement target is interposed between the meta-lens and the first polarization structure. The measurement target includes a center area and an edge area surrounding the center area. The center area of the measurement target is imaged by the image sensor based on the voltage applied to the first polarization structure being a first voltage and the voltage applied to the second polarization structure being a second voltage, and the second voltage being different than the first voltage.

Embodiments of the inventive concepts still further provide an imaging inspection apparatus that includes a measurement target; a light source that irradiates measurement light toward the measurement target; a first polarizing plate that polarizes the measurement light into first polarized light; a meta-lens on which the first polarized light is incident; a first liquid crystal interposed between the first polarizing plate and the meta-lens; a first power supply connected to the first liquid crystal, and the first power supply applies a first voltage to the first liquid crystal; a second polarizing plate that converts the first polarized light having that passes through the meta-lens into second polarized light; a second liquid crystal interposed between the second polarizing plate and the meta-lens; a second power supply connected to the second liquid crystal, and the second power supply applies a second voltage different from the first voltage to the second liquid crystal; an objective lens interposed between the second liquid crystal and the meta-lens; and an image sensor that senses the second polarized light. The measurement target is interposed between the meta-lens and the first liquid crystal. The measurement target includes a center area and an edge area surrounding the center area. The first and second power supplies adjust each of an intensity of the first voltage and an intensity of the second voltage to image the center area of the measurement target or the edge area of the measurement target.

Details of other example embodiments are included in the detailed description and drawings.

BRIEF DESCRIPTION OF DRAWINGS

The above and other aspects and features of the present disclosure will become more apparent by describing in detail illustrative example embodiments thereof with reference to the attached drawings, in which:

FIG. 1 is a schematic conceptual diagram illustrating an imaging system according to some example embodiments of the inventive concepts.

DETAILED DESCRIPTION

Figure 2:
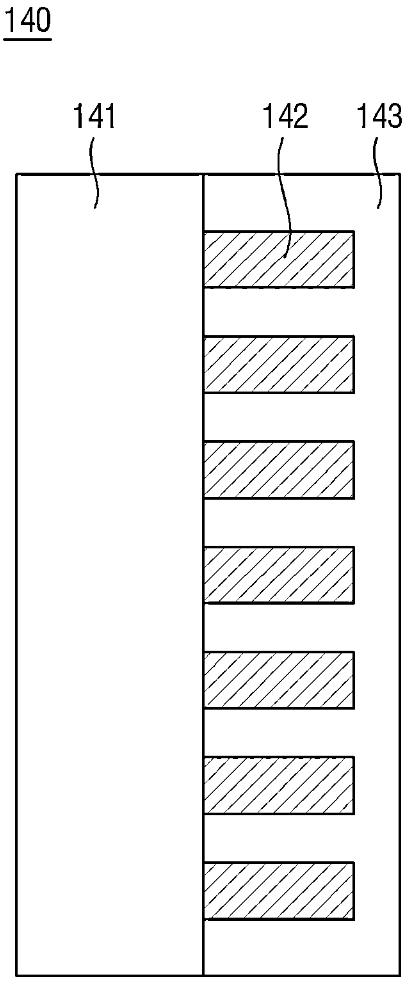
FIG. 2 is a diagram illustrating the meta-lens in FIG. 1.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the inventive concepts, numerous specific details are set forth in order to provide a thorough understanding of the inventive concepts. However, it will be understood that the inventive concepts may be practiced without these specific details. In other instances, well-known methods, procedures, components, and circuits have not been described in detail so as not to unnecessarily obscure aspects of the inventive concepts. Some example embodiments are illustrated and described further below. It will be understood that the description herein is not intended to limit the claims to the example embodiments described. On the contrary, it is intended to cover alternatives, modifications, and equivalents as may be included in the spirit and scope of the inventive concepts as defined by the appended claims.

A shape, a size, a ratio, an angle, a number, etc. disclosed in the drawings for illustrating example embodiments of the inventive concepts are illustrative, and the inventive concepts are not limited thereto. The same reference numerals refer to the same elements herein.

The terminology used herein is for the purpose of describing example embodiments only and is not intended to limit the inventive concepts. As used herein, the singular forms “a” and “an” are intended to include the plural forms as well, unless the context clearly indicates otherwise. It will be further understood that the terms “comprise”, “comprising”, “include”, and “including” when used in this specification, specify the presence of the stated features, integers, operations, elements, and/or components, but do not preclude the presence or addition of one or more other features, integers, operations, elements, components, and/or portions thereof. As used herein, the term “and/or” includes any and all combinations of one or more of the associated listed items. Expression such as “at least one of” when preceding a list of elements may modify an entirety of list of elements and may not modify the individual elements of the list. When referring to “C to D”, this means C inclusive to D inclusive unless otherwise specified.

It will be understood that, although the terms “first”, “second”, “third”, and so on may be used herein to illustrate various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the inventive concepts.

It will be understood that when an element or layer is referred to as being “connected to”, or “coupled to” another element or layer, it may be directly on, connected to, or coupled to the other element or layer, or one or more intervening elements or layers may be present. It will also be understood that when an element or layer is referred to as being “between” two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as “after”, “subsequent to”, “before”, etc., another event may occur therebetween unless “directly after”, “directly subsequent” or “directly before” is not indicated. The features of the various example embodiments of the inventive concepts may be partially or entirely combined with each other, and may be technically associated with each other or operate with each other.

When the terms “about” or “substantially” are used in this specification in connection with a numerical value, it is intended that the associated numerical value includes a manufacturing or operational tolerance (e.g., ±10%) around the stated numerical value. Moreover, when the words “generally” and “substantially” are used in connection with geometric shapes, it is intended that precision of the geometric shape is not required but that latitude for the shape is within the scope of the disclosure. Further, regardless of whether numerical values or shapes are modified as “about” or “substantially,” it will be understood that these values and shapes should be construed as including a manufacturing or operational tolerance (e.g., ±10%) around the stated numerical values or shapes. When ranges are specified, the range includes all values therebetween such as increments of 0.1%.

Also, for example, “at least one of A, B, and C” and similar language (e.g., “at least one selected from the group consisting of A, B, and C”) may be construed as A only, B only, C only, or any combination of two or more of A, B, and C, such as, for instance, ABC, AB, BC, and AC.

Figure 1:
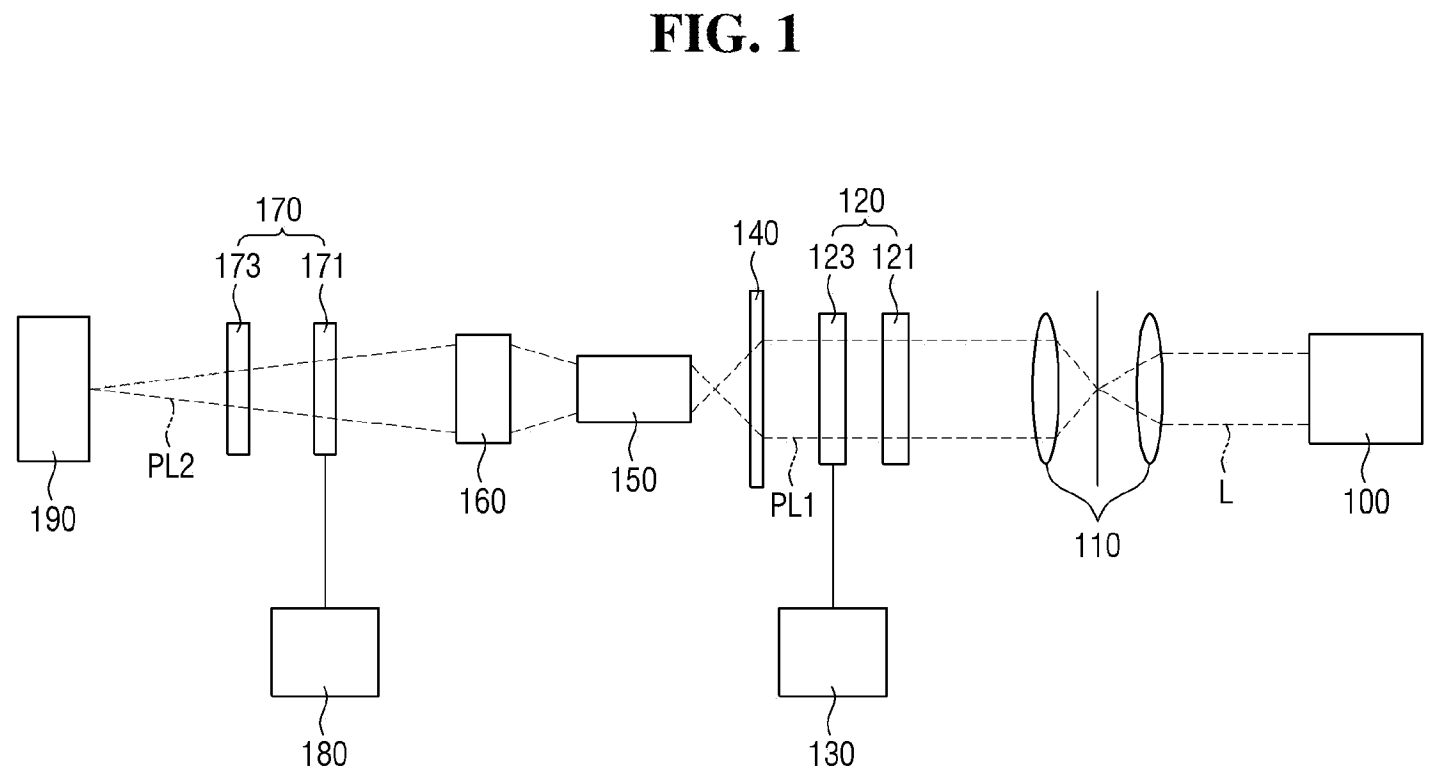

FIG. 1 is a schematic conceptual diagram illustrating an imaging system according to some example embodiments of the inventive concepts.

First, referring to FIG. 1, the imaging system according to some example embodiments may include a light source 100, a filter 110, a first polarization structure 120, a first power supply 130, a meta-lens 140, an objective lens 150, a tube lens 160, a second polarization structure 170, a second power supply 180, and an image sensor 190.

The imaging system according to some example embodiments may inspect light L provided from the light source 100. The light source 100 may generate and provide the light L. The light L provided from the light source 100 may be light generated from the light source 100, or may be reflected light obtained by reflecting light provided from another light source. The light source 100 may be a system composed of various optical elements such as a collimator, a polarizer, and a light-condensing lens. However, the inventive concepts are not limited thereto.

In some example embodiments, the light source 100 may be embodied as a sodium lamp, a mercury lamp, etc. which emits light of a discontinuous spectrum. In some other example embodiments, the light source 100 may be embodied as a laser that generates and outputs laser light. In some other example embodiments, the light source 100 may be embodied as one of a gas laser such as a helium-neon laser, a xenon laser, and a carbon dioxide laser, a solid-state laser such as a ruby crystal laser and a YAG (Yttrium Aluminum Garnet) laser, and a semiconductor laser such as a gallium arsenide (GaAs) laser and an indium phosphide (InP) laser. However, the technical idea of the inventive concepts is not limited thereto.

The light source 100 may generate or emit the light L having a wavelength of about 100 nm to about 1000 nm. That is, the wavelength of the light L may be in a range of about 100 nm to about 1000 nm.

The light L generated from the light source 100 may be provided to the filter 110. The filter 110 may selectively transmit light of only a wavelength of a specific frequency therethrough. In some example embodiments, the filter 110 may be a spatial filter. The spatial filter may be used to remove random fluctuations from an intensity profile of the laser beam, thereby increasing a resolution of an optical system. In some other example embodiments, the filter 110 may include a band pass filter (BPF), a monochromator, and/or a spectrometer.

The light L having passed through the filter 110 may be provided to the first polarization structure 120. The first polarization structure 120 may polarize the provided light L into first polarized light PL1. For example, the first polarization structure 120 may be composed of a first polarizing plate 121 and a first liquid crystal 123. The first polarizing plate 121 may be interposed between the first liquid crystal 123 and the filter 110. The first liquid crystal 123 may be interposed between the first polarizing plate 121 and the meta-lens 140. That is, the light L may pass through the first polarizing plate 121 and then pass through the first liquid crystal 123.

In some example embodiments, the first power supply 130 may be connected to the first liquid crystal 123. The first power supply 130 may apply a voltage to the first liquid crystal 123. A phase of the first polarized light PL1 may be determined depending on an intensity of the voltage applied to the first liquid crystal 123.

For example, when a first voltage is applied to the first liquid crystal 123, the first polarized light PL1 may be left-circularly polarized light (LCP). In another example, when a second voltage different from the first voltage is applied to the first liquid crystal 123, the first polarized light PL1 may be right-circularly polarized light (RCP). That is, the imaging system according to some example embodiments may determine the phase of the first polarized light PL1 by adjusting the intensity of the voltage provided from the first power supply 130.

In some example embodiments, the first polarizing plate 121 may be a linear polarizer. The first liquid crystal 123 may be made of liquid crystals. The light L may pass through the first polarizing plate 121 and the first liquid crystal 123 and thereafter, may be polarized into the first polarized light PL1 as circularly polarized light.

The first polarized light PL1 may be provided to the meta-lens 140. The meta-lens 140 may be interposed between the objective lens 150 and the first liquid crystal 123. The first polarized light PL1 having passed through the meta-lens 140 may have a hyperbolic phase or a hyperbolic spiral phase.

For example, when the first polarized light PL1 is the left-circularly polarized light LCP, the first polarized light PL1 having passed through the meta-lens 140 may have a hyperbolic phase. On the contrary, when the first polarized light PL1 is the right-circularly polarized light RCP, the first polarized light PL1 having passed through the meta-lens 140 may have a hyperbolic spiral phase.

Hereinafter, with reference to FIG. 2, the meta-lens 140 is described in detail. FIG. 2 is a diagram for illustrating the meta-lens in FIG. 1.

Referring to FIG. 2, the meta-lens 140 according to some example embodiments may include a substrate 141, a plurality of nano-structures 142, and a spacer layer 143. The plurality of nano-structures 142 may be disposed on the substrate 141. The spacer layer 143 may cover the plurality of nano-structures 142 and the substrate 141.

The substrate 141 may be made of a material with a refractive index different from that of each of the plurality of nano-structures 142. The difference between the refractive index of the substrate 141 and that of each of the plurality of nano-structures 142 may be 0.5 or greater. In some example embodiments, the refractive index of each of the plurality of nano-structures 142 may be higher than the refractive index of the substrate 141. In other example embodiments, the refractive index of each of the plurality of nano-structures 142 may be lower than the refractive index of the substrate 141.

The spacer layer 143 may be made of a material with a refractive index different from that of each of the plurality of nano-structures 142. The difference between the refractive index of the spacer layer 143 and that of each of the plurality of nano-structures 142 may be 0.5 or greater. In some example embodiments, the refractive index of the spacer layer 143 may be lower than the refractive index of each of the plurality of nano-structures 142. In some other example embodiments, the refractive index of the spacer layer 143 may be higher than the refractive index of each of the plurality of nano-structures 142. In some example embodiments the spacer layer 143 may be omitted.

The substrate 141 may be made of any of following materials: glass (fused silica, BK7, etc.), quartz, polymer (PMMA, SU-8, etc.), and plastic. The substrate 141 may be a semiconductor substrate.

Each of the plurality of nano-structures 142 may include at least one of c-Si (e.g., crystalline silicon), p-Si (e.g., polycrystalline silicon), a-Si (e.g., amorphous silicon), and III-V compound semiconductor (GaP, GaN, GaAs, etc.), SiC, $TiO_2$, and SiN. The spacer layer 143 may be made of a polymer material such as SU-8 or PMMA, or a low refractive index material such as $SiO_2$.

The plurality of nano-structures 142 have a shape dimension of a sub-wavelength. The shape dimension means at least one of various dimensions defining the shape of the plurality of nano-structures 142. The shape dimension of the sub-wavelength means a dimension smaller than a wavelength of light that the meta-lens 140 condenses. Accordingly, an effective refractive index of the meta-lens 140 may be determined based on a density of the plurality of nano-structures 142. For example, an area of the meta-lens 140 with a high density of the plurality of nano-structures 142 with a high refractive index has a high effective refractive index. Therefore, the effective refractive index of the meta-lens 140 may be controlled by adjusting an arrangement or a shape of the plurality of nano-structures 142.

Referring back to FIG. 1, the first polarized light PL1 that has passed through the meta-lens 140 may pass through the objective lens 150 and the tube lens 160 in this order. That is, the objective lens 150 may be interposed between the tube lens 160 and the meta-lens 140. The objective lens 150 may condensate the first polarized light PL1 that has passed through the meta-lens 140. The tube lens 160 may form an image.

The first polarized light PL1 having passed through the objective lens 150 and the tube lens 160 may be provided to the second polarization structure 170.

The second polarization structure 170 may polarize the provided first polarized light PL1 into second polarized light PL2. The second polarization structure 170 may be composed of, for example, a second polarizing plate 173 and a second liquid crystal 171. The second polarizing plate 173 may be interposed between the second liquid crystal 171 and the image sensor 190. The second liquid crystal 171 may be interposed between the second polarizing plate 173 and the meta-lens 140. That is, the first polarized light PL1 may pass through the second liquid crystal 171 and then pass through the second polarizing plate 173.

In some example embodiments, the light L may first pass through the first polarizing plate 121 and then pass through the first liquid crystal 123. However, the first polarized light PL1 may first pass through the second liquid crystal 171 and then pass through the second polarizing plate 173.

In some example embodiments, the second power supply 180 may be connected to the second liquid crystal 171. The second power supply 180 may apply a voltage to the second liquid crystal 171. A phase of the second polarized light PL2 may be determined depending on an intensity of the voltage applied to the second liquid crystal 171.

For example, when a first voltage is applied to the second liquid crystal 171, the second polarized light PL2 may be left-circularly polarized light LCP. In another example, when a second voltage different from the first voltage is applied to the second liquid crystal 171, the second polarized light PL2 may be right-circularly polarized light RCP. That is, the imaging system according to some example embodiments may determine the phase of the second polarized light PL2 by adjusting the intensity of the voltage provided from the second power supply 180.

In this regard, the intensity of the voltage provided from the second power supply 180 may be determined based on the intensity of the voltage provided from the first power supply 130. In some example embodiments, when the intensity of the voltage provided from the first power supply 130 is a first voltage, the intensity of the voltage provided from the second power supply 180 may be a second voltage different from the first voltage. In some example embodiments, when the intensity of the voltage provided from the first power supply 130 is a second voltage, the intensity of the voltage provided from the second power supply 180 may be a first voltage different from the second voltage.

In some example embodiments, second polarizing plate 173 may be a linear polarizer. The second liquid crystal 171 may be made of liquid crystals. The first polarized light PL1 having passed through the second liquid crystal 171 and the second polarizing plate 173 may be converted into second polarized light PL2. Rotation directions of the first polarized light PL1 and the second polarized light PL2 may be different from each other. For example, when the first polarized light PL1 is the left-circularly polarized light LCP, the second polarized light PL2 may be the right-circularly polarized light RCP. In some other example embodiments, when the first polarized light PL1 is the right-circularly polarized light RCP, the second polarized light PL2 may be the left-circularly polarized light LCP.

Each of the first polarized light PL1 and the second polarized light PL2 may be determined according to the intensity of each of the voltages respectively provided from the first power supply 130 and the second power supply 180. Furthermore, the phase of each of the first polarized light PL1 and the second polarized light PL2 may be determined according to the intensity of each of the voltages respectively provided from the first power supply 130 and the second power supply 180.

The second polarized light PL2 may be provided to the image sensor 190. The image sensor 190 may receive the second polarized light PL2. The image sensor 190 may detect an intensity of the received second polarized light PL2. The image sensor 190 may include a photodiode, a camera, etc. For example, the image sensor 190 may include a single photodiode, a photodiode-array composed of a plurality of photodiodes, a line camera, and/or a 2-dimensional 2D camera.

Figure 3:
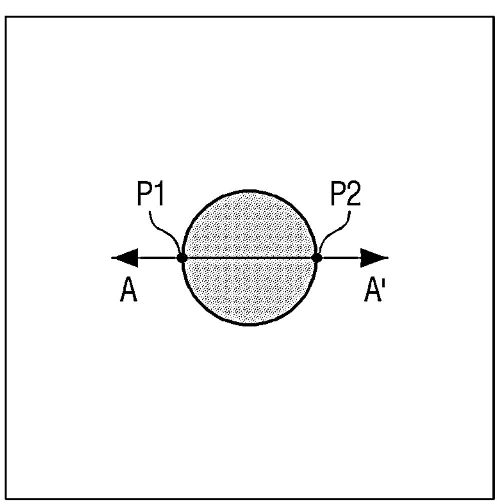
FIG. 3 is a diagram showing an intensity of light in a plan view.
Figure 4:
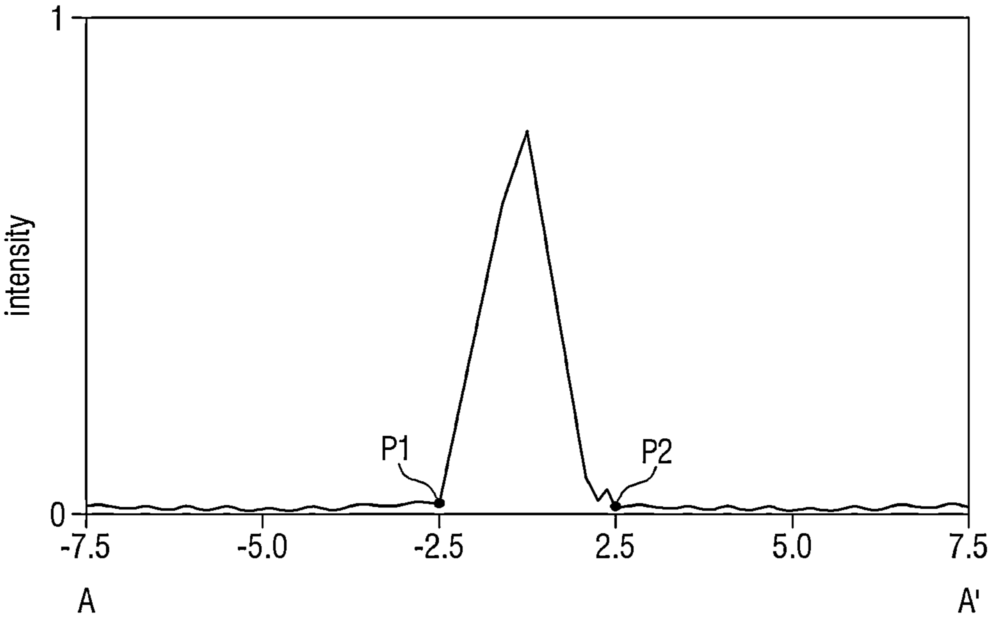
FIG. 4 is a graph showing the intensity of light based on a position on a plane of a focal length.
Figure 5:
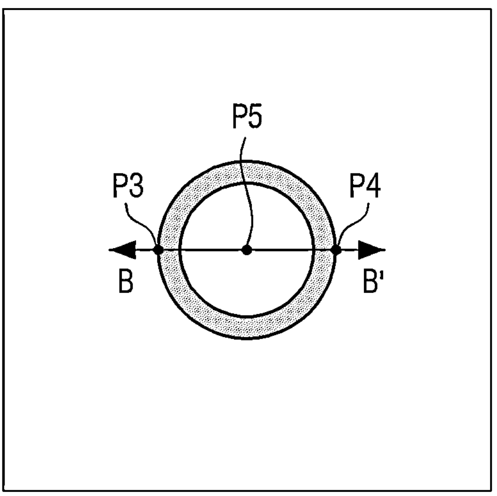
FIG. 5 is a diagram showing the intensity of light in a plan view.
Figure 6:
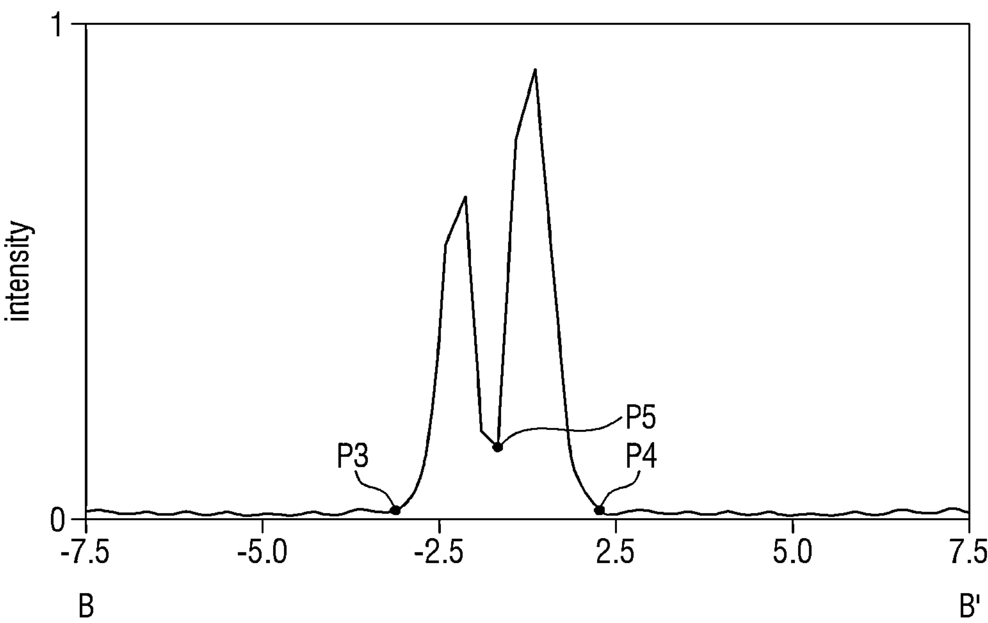
FIG. 6 is a graph showing the intensity of light based on the position on the plane of the focal length.

Hereinafter, effects of the imaging system according to some example embodiments are described in detail with reference to FIGS. 3 to 6. FIG. 3 is a diagram showing an intensity of light in a plan view. FIG. 4 is a graph showing the intensity of light based on a position on a plane of a focal length. FIG. 5 is a diagram showing the intensity of light in a plan view. FIG. 6 is a graph showing the intensity of light based on the position on the plane of the focal length.

When using the imaging system according to some example embodiments, a bright-field microscopy function and an edge-enhanced microscopy function may be implemented in a single imaging system. Using the bright-field microscopy function, information about a center area of a sample may be extracted. Using the edge-enhanced microscopy function, information about an edge area of the sample may be extracted.

In some example embodiments, when the first polarized light PL1 is the left-circularly polarized light LCP, the imaging system may have the bright-field microscopy function. On the other hand, when the first polarized light PL1 is the right-circularly polarized light RCP, the imaging system may have the edge-enhanced microscopy function. That is, the function of the imaging system may be determined by controlling each of the first power supply 130 and the second power supply 180.

FIG. 3 and FIG. 4 are diagrams showing an intensity of the second polarized light PL2 sensed by the image sensor when the first polarized light PL1 is the left-circularly polarized light LCP.

In FIG. 3, in a plan view, the intensity of the second polarized light PL2 may be point or circle shaped. In FIG. 4, the intensity of the second polarized light PL2 as measured may be the greatest at a center of the focus. The intensity of the second polarized light PL2 may gradually decrease as a position is increasingly away from the focus. For example, at a first point P1 and a second point P2, the intensity of the second polarized light PL2 may be substantially zero. At a midpoint between the first point P1 and the second point P2, the intensity of the second polarized light PL2 may be the greatest. Accordingly, information about the center area of the sample may be extracted.

FIG. 5 and FIG. 6 are diagrams showing the intensity of the second polarized light PL2 sensed by the image sensor when the first polarized light PL1 is the right-circularly polarized light RCP.

In FIG. 5, in a plan view, the intensity of the second polarized light PL2 may be donut-shaped. In FIG. 6, the intensity of the second polarized light PL2 may be the lowest at the center of the focus. For example, the intensity of the second polarized light PL2 at each of the third point P3 and the fourth point P4 may be substantially 0. The intensity of the second polarized light PL2 at a fifth point P5 may be small. The intensity of the second polarized light PL2 at a point between the third point P3 and the fifth point P5, or at a point between the fourth point P4 and the fifth point P5 may be the greatest. Accordingly, information about the edge area of the sample may be extracted.

In this way, the imaging system according to some example embodiments may extract the information about the center area of the sample and the information about the edge area of the sample in a single system. Accordingly, an imaging system with improved efficiency and performance may be provided.

Figure 7:
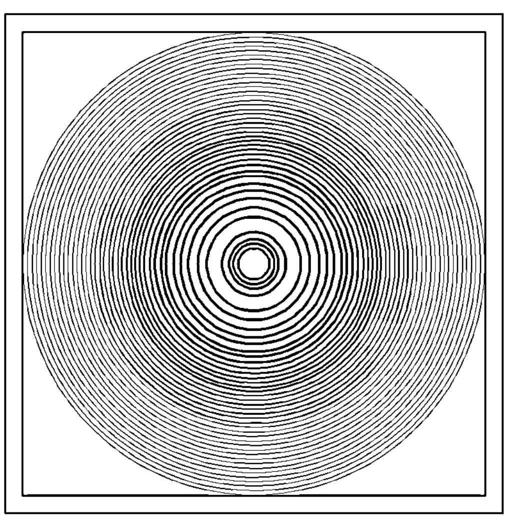
FIG. 7 and FIG. 8 are phase maps of light detected by an imaging system according to some example embodiments of the inventive concepts.
Figure 8:
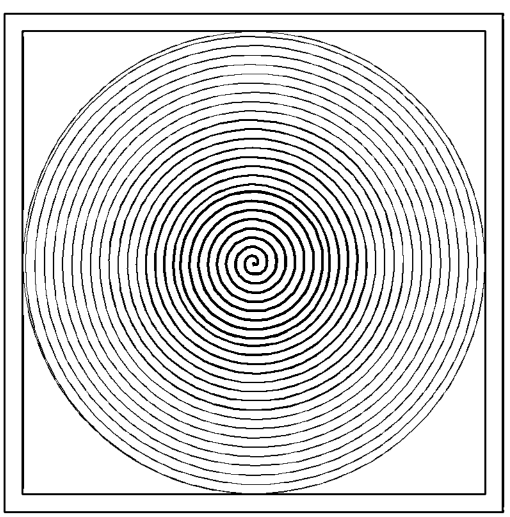

FIG. 7 and FIG. 8 are phase maps of light detected by an imaging system according to some example embodiments. FIG. 7 may be a phase map of the left-circularly polarized light, and FIG. 8 may be a phase map of the right-circularly polarized light.

First, referring to FIG. 7, the phase map of the left-circularly polarized light may have a hyperbolic phase. Therefore, when the left-circularly polarized light is detected, the information about the center area of the sample may be extracted.

Referring to FIG. 8, the phase map of the right-circularly polarized light may have a hyperbolic spiral phase. Therefore, when the right-circularly polarized light is detected, the information about the edge area of the sample may be extracted.

Figure 9:
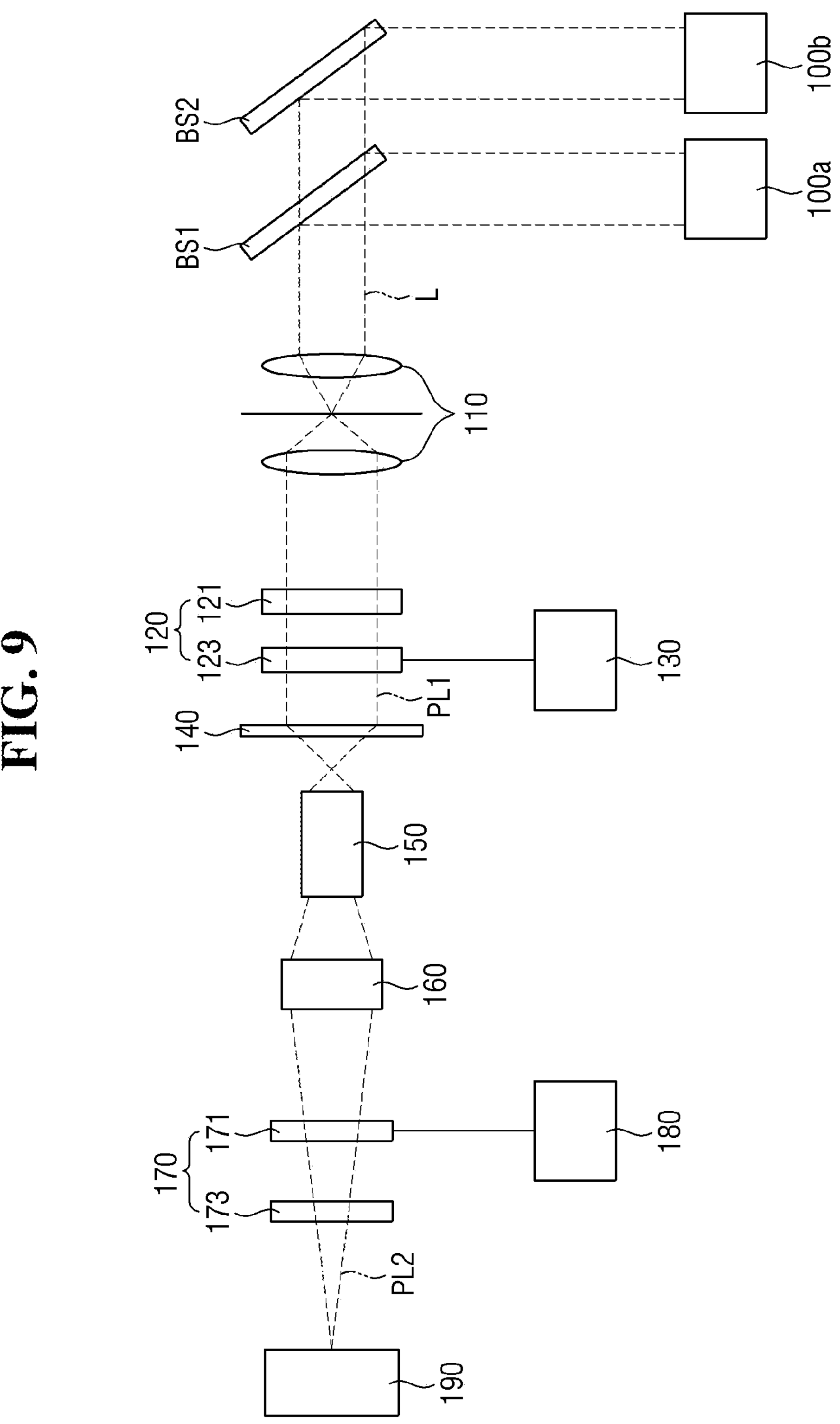
FIG. 9 is a diagram illustrating an imaging system according to some other example embodiments of the inventive concepts.

FIG. 9 is a diagram illustrating an imaging system according to some other example embodiments of the inventive concepts. For convenience of description, following descriptions are based on differences thereof from the descriptions using FIG. 1.

Referring to FIG. 9, the imaging system according to some example embodiments may further include first and second beam splitters BS1 and BS2. The light source may include a first light source 100*a* and a second light source 100*b*.

Light provided from the first light source 100*a* may be incident on the first beam splitter BS1. The first beam splitter BS1 may change a travel path of the light provided from the first light source 100*a*. Light provided from the second light source 100*b* may be incident on the second beam splitter BS2. The second beam splitter BS2 may change a travel path of the light provided from the second light source 100*b*.

That is, when using the imaging system according to some example embodiments, the path of the light may be changed through the beam splitters BS1 and BS2. Thus, the imaging system with improved integration may be provided.

Figure 10:
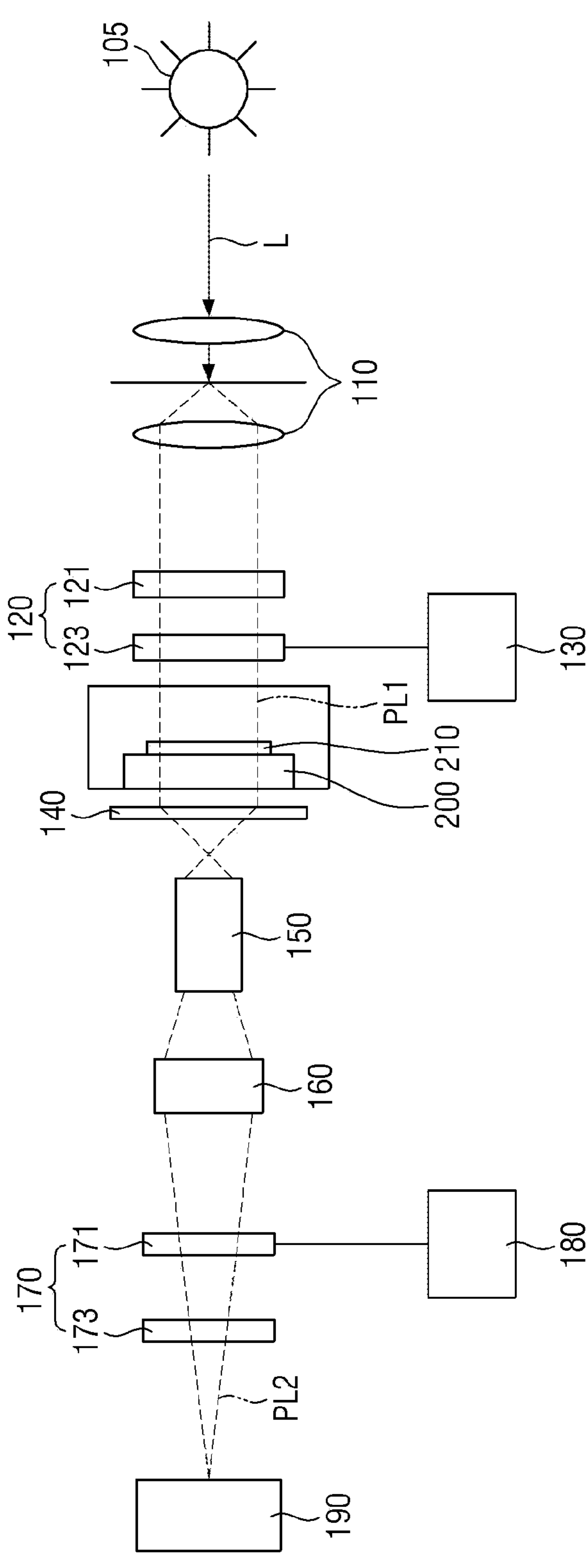
FIG. 10 is a diagram illustrating an imaging inspection apparatus according to some other example embodiments of the inventive concepts.

FIG. 10 is a diagram illustrating an imaging inspection apparatus according to some other example embodiments. The imaging inspection apparatus according to some example embodiments may include the imaging system as described using FIGS. 1 to 9.

The imaging inspection apparatus according to some example embodiments may include a light source for measurement 105, a stage 200, a measurement target 210, the first polarization structure 120, the first power supply 130, the meta-lens 140, the second polarization structure 170, the second power supply 180, and the image sensor 190.

The imaging inspection apparatus according to some example embodiments may be used to analyze patterns formed on the measurement target 210. However, the inventive concepts are not limited thereto. The imaging inspection apparatus according to some example embodiments may image a center area CR and an edge area ER of the measurement target 210 using a single imaging inspection apparatus.

The measurement target 210 may be interposed between the meta-lens 140 and the first polarization structure 120. Measurement light L having passed through the measurement target 210 may pass through the meta-lens 140. Likewise, the stage 200 may also be interposed between the meta-lens 140 and the first polarization structure 120.

The measurement target 210 may be placed on the stage 200. For example, the measurement target 210 may be a semiconductor measurement target 210. For example, the measurement target 210 may be a mask including a pattern, a wafer, and/or silicon (Si). Furthermore, the measurement target 210 may be a semiconductor element including multiple pattern layers or overlay marks.

The measurement target 210 may be a silicon wafer. Alternatively, the measurement target 210 may include a semiconductor element such as germanium, or a compound semiconductor such as silicon carbide (SiC), gallium arsenide (GaAs), indium arsenide (InAs), and indium phosphide (InP). Alternatively, the measurement target 210 may have a silicon on insulator (SOI) structure. In some example embodiments, the measurement target 210 may include an impurity-doped well or an impurity-doped structure as a conductive area. At least one material layer may be formed on the measurement target 210.

The wafer may be used to manufacture either a memory element or a non-memory element. In some example embodiments, the memory element may be non-volatile NAND flash memory. In some example embodiments, the memory element may include PRAM, MRAM, ReRAM, FRAM, NOR flash memory, etc. Furthermore, the memory element may be a volatile memory element such as DRAM, SRAM, etc., in which data is lost when power is turned off. According to some example embodiments, the memory element may be a logic chip, a measurement element, a communication element, a digital signal processor (DSP), or a system on chip (SOC).

In some example embodiments, the measurement target 210 may have a multilayer structure. A multilayer may refer to a structure in which layers respectively made of two different materials are sequentially stacked. For example, when forming a vertical NAND (VNAND), a multilayer in which a silicon oxide layer/a silicon nitride layer are sequentially stacked may be formed on the wafer. Furthermore, when forming a multi-bridge channel field effect transistor (MBCFET), a multilayer in which a silicon layer/a silicon germanium layer are sequentially stacked may be formed on the wafer. For example, when etching a portion of the multilayer in which a silicon layer/a silicon germanium layer are sequentially stacked, the imaging inspection apparatus may inspect an etched depth of the multilayer in which the silicon layer/the silicon germanium layer are sequentially stacked. However, this is only an example, and the imaging inspection apparatus in accordance with other example embodiments may inspect various types of measurement targets 210.

The imaging inspection apparatus according to some example embodiments may measure and analyze various characteristics of the measurement target 210. The imaging inspection apparatus according to some example embodiments may detect light having transmitted through the measurement target 210 and may analyze the polarization state of the detected light, and may measure and analyze the various characteristics of the measurement target 210 such as an overlay error, a pattern size, a pattern thickness, and a uniformity of the pattern, based on the analysis result. Furthermore, according to other example embodiments, the imaging inspection apparatus according to some example embodiments may detect defects in a pattern of the measurement target 210 or foreign substances.

The stage 200 may support the measurement target 210. The measurement target 210 may be placed on an upper surface of the stage 200, and the stage 200 may support the measurement target 210 placed on the upper surface thereof. In some example embodiments, the stage 200 may be configured to vacuum-suction the measurement target 210. In some example embodiments, stage 200 may include an electrostatic chuck configured to secure the measurement target 210 using an electrostatic force. The upper surface of the stage 200 on which the measurement target 210 is supported may be a plane parallel to X and Y directions, and may be perpendicular to a Z direction.

The stage 200 may include an actuator such as a motor and may be configured to move under an operation of the actuator. In some example embodiments, the stage 200 may move in the X and Y directions on the XY plane, and may also move in the Z direction perpendicular to the XY plane. In some example embodiments, the stage 200 may rotate about a rotation axis. The rotation axis of the stage 200 may be parallel to any one of the X-direction, the Y-direction, and the Z-direction.

The light source 105 for measurement may generate and output measurement light L. The light source 105 for measurement may generate the measurement light L and may irradiate the measurement light L1 toward the measurement target 210 mounted on the stage 200. The light source 105 for measurement may include a single light source or a plurality of light sources. The light source 105 for measurement may generate and output light of a broadband wavelength. The measurement light L generated from the light source 105 for measurement may have wavelengths in a range of an ultraviolet ray, a visible ray, a near infrared ray, and an infrared ray. In some example embodiments, the light source 105 for measurement may generate and output the measurement light L in a band of about 200 nm to about 2100 nm. In some example embodiments, the light source 105 for measurement may generate and output coherent light. In some example embodiments, the light source 105 for measurement may be configured to output white light. The light source 105 for measurement may be, but is not limited to, a halogen lamp light source, an LED light source, or a laser light source that generates continuous spectrum light.

The measurement light L having passed through the filter 110 may be provided to the first polarization structure 120. The first polarization structure 120 may polarize the provided measurement light L into the first polarized light PL1. The first polarized light PL1 may be the left-circularly polarized light or the right-circularly polarized light. The phase of the first polarized light PL1 may be determined depending on the intensity of the voltage applied to the first liquid crystal 123.

The first polarized light PL1 may pass through the measurement target 210 and the meta-lens 140. The first polarized light PL1 having passed through the meta-lens 140 may have a hyperbolic phase or a hyperbolic spiral phase.

The first polarized light PL1 may pass through the objective lens 150 and the tube lens 160 and then may be provided to the second polarization structure 170. The second polarization structure 170 may polarize the first polarized light PL1 into the second polarized light PL2. The second polarized light PL2 may be the left-circularly polarized light or the right-circularly polarized light. The phase of the second polarized light PL2 may be determined depending on the intensity of the voltage applied to the second liquid crystal 171.

The second polarized light PL2 may be provided to the image sensor 190, and the image sensor 190 may detect the second polarized light PL2. The image senor may analyze the second polarized light PL2, and may inspect, analyze, or image the measurement target 210, based on the analyzing result of the second polarized light PL2.

Figure 11:
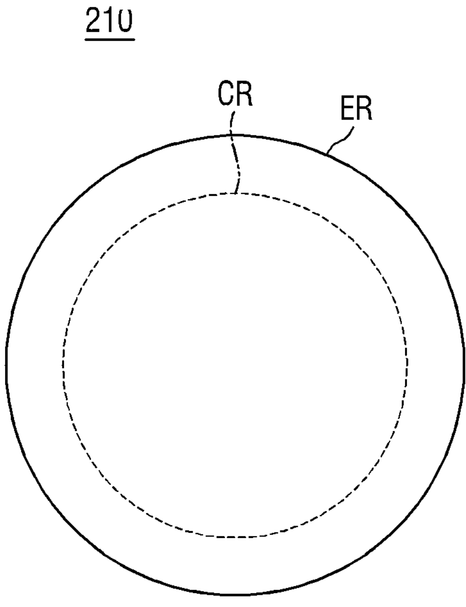
FIG. 11 is a diagram illustrating a measurement target according to some example embodiments of the inventive concepts.

FIG. 11 is a diagram for illustrating a measurement target according to some example embodiments. Referring to FIG. 11, the measurement target 210 may include the center area CR and the edge area ER. The center area CR may be a central portion of the measurement target 210. The edge area ER may be an edge portion of the measurement target 210. Alternatively, the edge area ER may be a boundary portion of the measurement target 210. The center area CR may be defined by the edge area ER.

Using the imaging inspection apparatus according to some example embodiments, the center area CR and the edge area ER of the measurement target 210 may be imaged by a single imaging inspection apparatus. For example, when the first polarized light PL1 is the left-circularly polarized light and the second polarized light PL2 is the right-circularly polarized light, the imaging inspection apparatus according to some example embodiments may image the center area CR of the measurement target 210. As another example, when the first polarized light PL1 is the right-circularly polarized light and the second polarized light PL2 is the left-circularly polarized light, the imaging inspection apparatus according to some example embodiments may image the edge area ER of the measurement target 210.

As previously described, the phases of the first polarized light PL1 and the second polarized light PL2 may be respectively determined by adjusting the intensities of the voltages respectively provided from the first power supply 130 and the second power supply 180. For example, when imaging the center area CR of the measurement target 210, the first voltage may be applied from the first power supply 130 to the first liquid crystal 123 and the second voltage may be applied from the second power supply 180 to the second liquid crystal 171. As another example, when imaging the edge area ER of the measurement target 210, the second voltage may be applied from the first power supply 130 to the first liquid crystal 123 and the first voltage may be applied from the second power supply 180 to the second liquid crystal 171.

Accordingly, the imaging inspection apparatus with improved efficiency and performance may be provided.

Hereinafter, a method for operating an imaging inspection apparatus according to some example embodiments is described.

Figure 12:
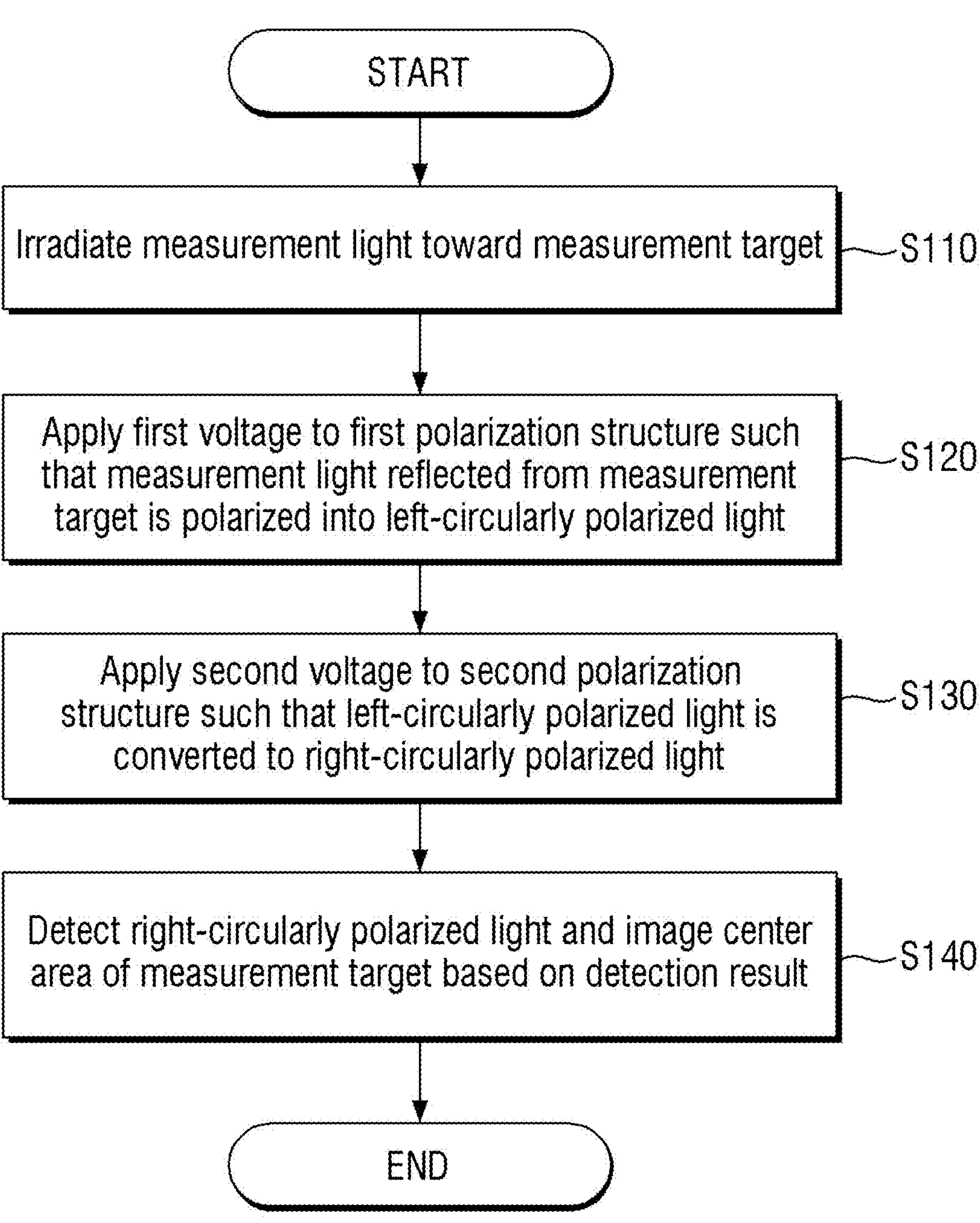
FIG. 12 and FIG. 13 are flow charts for illustrating the method for operating the imaging inspection apparatus according to some example embodiments of the inventive concepts.
Figure 13:
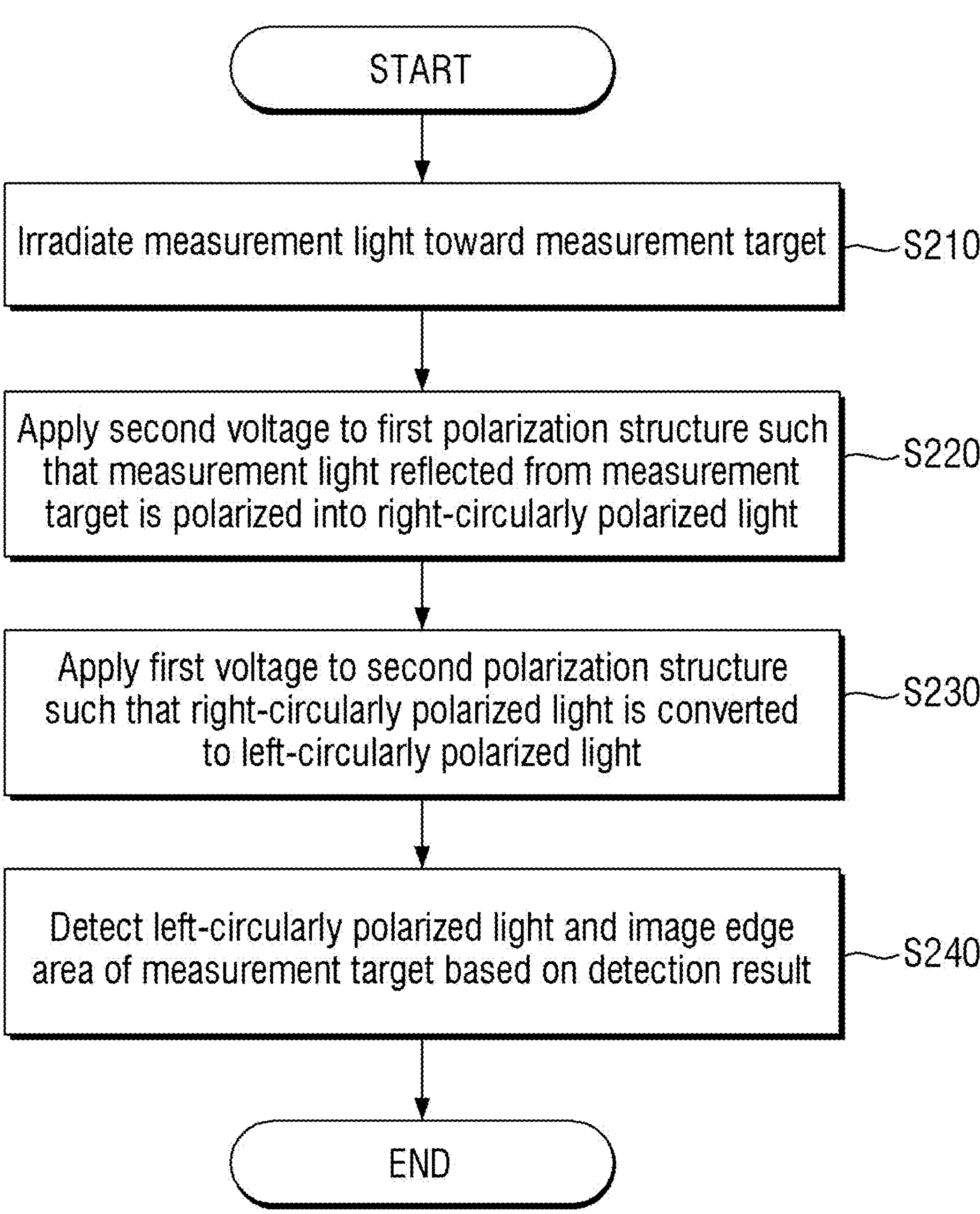

FIG. 12 and FIG. 13 are flow charts for illustrating the method for operating the imaging inspection apparatus according to some example embodiments. For reference, FIG. 12 is a diagram showing a method for imaging the center area CR of the measurement target, and FIG. 13 is a diagram showing a method for imaging the edge area ER of the measurement target.

First, referring to FIGS. 10 to 12, the measurement light L may be irradiated toward the measurement target 210 in S110. The measurement light L may be provided from the light source 105 for measurement.

The measurement light L may pass through the first filter 110 and then be provided to the first polarization structure 120. The first voltage may be applied from the first power supply 130 to the first polarization structure 120, such that the measurement light L may be polarized into the left-circularly polarized light in S120.

That is, the first polarization structure 120 may polarize the measurement light L into the first polarized light PL1.

The first polarized light PL1 may sequentially pass through the measurement target 210 and the meta-lens 140. The first polarized light PL1 that has passed through the measurement target 210 and the meta-lens 140 may have a hyperbolic phase. The first polarized light PL1 may pass through the objective lens 150 and the tube lens 160 and then be provided to the second polarization structure 170. The second voltage may be applied from the second power supply 180 to the second polarization structure 170, such that the left-circularly polarized light may be converted into the right-circularly polarized light in S130. That is, the second polarization structure 170 may polarize the first polarized light PL1 into the second polarized light PL2.

The image sensor may detect the second polarized light PL2, and may image the center area CR of the measurement target 210 based on the detection result in S140.

Next, referring to FIG. 10, FIG. 11, and FIG. 13, the measurement light L may be irradiated toward the measurement target 210 in S210. The measurement light L may be provided from the light source 105 for measurement.

The measurement light L may pass through the first filter 110 and then be provided to the first polarization structure 120. The second voltage may be applied from the first power supply 130 to the first polarization structure 120, such that the measurement light L may be polarized into the right-circularly polarized light in S220. The second voltage may be substantially the same as the voltage provided from the second power supply 180 in FIG. 12. The first polarization structure 120 may polarize the measurement light L into the first polarized light PL1.

The first polarized light PL1 may sequentially pass through the measurement target 210 and the meta-lens 140. The first polarized light PL1 that has passed through the measurement target 210 and the meta-lens 140 may have a hyperbolic spiral phase.

The first polarized light PL1 may pass through the objective lens 150 and the tube lens 160 and then be provided to the second polarization structure 170. The first voltage may be applied from the second power supply 180 to the second polarization structure 170, such that the right-circularly polarized light may be converted into the left-circularly polarized light in S230. The first voltage may be substantially the same as the voltage provided from the first power supply 130 in FIG. 12. The second polarization structure 170 may convert the first polarized light PL1 into the second polarized light PL2.

The image sensor may detect the second polarized light PL2, and may image the edge area ER of the measurement target 210 based on the detection result in S240.

In this way, the area of the measurement target 210 to be imaged may be determined by adjusting the intensity of the voltage provided from each of the first power supply 130 and the second power supply 180. The center area CR and edge area ER of the measurement target 210 may be imaged using one apparatus. Thus, the apparatus with improved efficiency and performance may be provided.

Although example embodiments of the inventive concepts have been described with reference to the accompanying drawings, the inventive concepts should not be limited to the above example embodiments, but may be implemented in various different forms. A person skilled in the art may appreciate that the inventive concepts may be practiced in other concrete forms without changing the technical spirit or essential characteristics of the inventive concepts. Therefore, it should be appreciated that the example embodiments as described above is not restrictive but illustrative in all respects.

What is claimed is:

1. An imaging system comprising:

a first polarization structure configured to polarize light provided from a light source into first polarized light responsive to a first voltage;

a first power supply connected to the first polarization structure, and the first power supply is configured to apply the first voltage to the first polarization structure;

a meta-lens on which the first polarized light is incident;

a second polarization structure configured to convert the first polarized light that passes through the meta-lens into second polarized light responsive to a second voltage;

a second power supply connected to the second polarization structure, and the second power supply configured to apply the second voltage to the second polarization structure; and an image sensor configured to sense the second polarized light, wherein the first voltage and the second voltage are different from each other, the first polarization structure includes a first polarizing plate and a first liquid crystal, the first power supply is connected to the first liquid crystal, and the first power supply is configured to apply the first voltage to the first liquid crystal, and the second polarization structure includes a second polarizing plate and a second liquid crystal, the second power supply is connected to the second liquid crystal, and the second power supply is configured to apply the second voltage to the second liquid crystal.

2. The imaging system of claim 1, wherein the first polarized light is left-circularly polarized light (LCP), and the second polarized light is right-circularly polarized light (RCP).

3. The imaging system of claim 2, wherein in a plan view, an intensity of the second polarized light sensed by the image sensor has a point shape.

4. The imaging system of claim 1, wherein the first polarized light is right-circularly polarized light (RCP), and the second polarized light is left-circularly polarized light (LCP).

5. The imaging system of claim 4, wherein in a plan view, an intensity of the second polarized light sensed by the image sensor has a donut shape.

6. The imaging system of claim 1, wherein the first liquid crystal is between the first polarizing plate and the meta-lens.

7. The imaging system of claim 6, wherein the second liquid crystal is between the second polarizing plate and the meta-lens.

8. The imaging system of claim 1, further comprising an objective lens and a tube lens between the meta-lens and the second polarization structure.

9. The imaging system of claim 1, wherein the first polarization structure is configured to change a phase of the first polarized light based on an intensity of the first voltage.

10. The imaging system of claim 9, wherein the second polarization structure is configured to change a phase of the second polarized light based on an intensity of the second voltage.

11. An imaging inspection apparatus comprising:
- a measurement target;
- a light source configured to irradiate measurement light toward the measurement target;
- a first polarization structure configured to polarize the measurement light into first polarized light;
- a first power supply connected to the first polarization structure;
- a meta-lens on which the first polarized light is incident;
- a second polarization structure configured to convert the first polarized light that passes through the meta-lens into second polarized light;
- a second power supply connected to the second polarization structure; and
- an image sensor configured to sense the second polarized light,
- wherein
- the measurement target is between the meta-lens and the first polarization structure,
- the measurement target includes a center area and an edge area surrounding the center area,
- responsive to a first voltage being applied to the first polarization structure by the first power supply and a second voltage being applied to the second polarization structure by the second power supply, and the second voltage being different than the first voltage, the center area of the measurement target is imaged,
- the first polarization structure includes a first polarizing plate and a first liquid crystal, and the first power supply is connected to the first liquid crystal and the first voltage applied to the first polarization structure is applied to the first liquid crystal, and
- the second polarization structure includes a second polarizing plate and a second liquid crystal, and the second power supply is connected to the second liquid crystal and the second voltage applied to the second polarization structure is applied to the second liquid crystal.

12. The imaging inspection apparatus of claim 11, wherein responsive to the second voltage being applied to the first polarization structure by the first power supply, and the first voltage being applied to the first polarization structure by the second power supply, the edge area of the measurement target is imaged.

13. The imaging inspection apparatus of claim 12, wherein the first polarization structure is configured to provide the first polarized light as right-circularly polarized light based on the second voltage applied to the first polarization structure, and the second polarization structure is configured to provide the second polarized light as left-circularly polarized light.

14. The imaging inspection apparatus of claim 11, wherein the first polarization structure is configured to provide the first polarized light as left-circularly polarized light based on the first voltage applied to the first polarization structure, and the second polarization structure is configured to provide the second polarized light as right-circularly polarized light.

15. The imaging inspection apparatus of claim 11, wherein the first liquid crystal is between the first polarizing plate and the meta-lens.

16. The imaging inspection apparatus of claim 15, wherein the second liquid crystal is between the second polarizing plate and the meta-lens.

17. The imaging inspection apparatus of claim 11, wherein the first polarization structure is configured to change a phase of the first polarized light based on a first intensity of the first voltage and a second intensity of the second voltage.

18. The imaging inspection apparatus of claim 17, wherein the second polarization structure is configured to change a phase of the second polarized light based on the first intensity of the first voltage and the second intensity of the second voltage.

19. An imaging inspection apparatus comprising:
- a measurement target;
- a light source configured to irradiate measurement light toward the measurement target;
- a first polarizing plate configured to polarize the measurement light into first polarized light;
- a meta-lens on which the first polarized light is incident;
- a first liquid crystal between the first polarizing plate and the meta-lens;
- a first power supply connected to the first liquid crystal, and the first power supply is configured to apply a first voltage to the first liquid crystal;
- a second polarizing plate configured to convert the first polarized light that passes through the meta-lens into second polarized light;
- a second liquid crystal between the second polarizing plate and the meta-lens;
- a second power supply connected to the second liquid crystal, and the second power supply configured to apply a second voltage different from the first voltage to the second liquid crystal;
- an objective lens between the second liquid crystal and the meta-lens; and
- an image sensor configured to sense the second polarized light,
- wherein the measurement target is between the meta-lens and the first liquid crystal,
- wherein the measurement target includes a center area and an edge area surrounding the center area, and
- wherein the first power supply and the second power supply are configured to adjust each of a first intensity of the first voltage and a second intensity of the second voltage to image the center area of the measurement target and the edge area of the measurement target.

20. The imaging inspection apparatus of claim 19, wherein the first liquid crystal is configured to change a phase of the first polarized light based on the first intensity of the first voltage, and wherein the second liquid crystal is configured to change a phase of the second polarized light based on the second intensity of the second voltage.

* * * * *